(12) United States Patent
Korhonen et al.

(10) Patent No.: US 12,177,805 B2
(45) Date of Patent: Dec. 24, 2024

(54) INTEGRATED ACCESS BACKHAUL NODE DOWNLINK TIMING ADJUSTMENT IN PRESENCE OF FREQUENCY OFFSET

(71) Applicant: Nokia Solutions and Networks Oy, Espoo (FI)

(72) Inventors: Juha Sakari Korhonen, Espoo (FI); Keeth Saliya Jayasinghe Laddu, Espoo (FI); Ilkka Keskitalo, Oulu (FI); Esa Malkamäki, Espoo (FI); Esa Tiirola, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 312 days.

(21) Appl. No.: 17/629,568

(22) PCT Filed: Jul. 9, 2020

(86) PCT No.: PCT/IB2020/056489
§ 371 (c)(1),
(2) Date: Jan. 24, 2022

(87) PCT Pub. No.: WO2021/028739
PCT Pub. Date: Feb. 18, 2021

(65) Prior Publication Data
US 2022/0272648 A1    Aug. 25, 2022

Related U.S. Application Data

(60) Provisional application No. 62/887,207, filed on Aug. 15, 2019.

(51) Int. Cl.
*H04W 56/00*    (2009.01)
*H04W 88/14*    (2009.01)

(52) U.S. Cl.
CPC ..... *H04W 56/0045* (2013.01); *H04W 56/001* (2013.01); *H04W 88/14* (2013.01)

(58) Field of Classification Search
CPC .................................................. H04W 56/0045
See application file for complete search history.

(56) References Cited

U.S. PATENT DOCUMENTS

2013/0142106 A1    6/2013 Zhang et al.
2015/0181595 A1    6/2015 Li et al.
(Continued)

FOREIGN PATENT DOCUMENTS

CN    106027218 A    10/2016
CN    109565307 A    4/2019
(Continued)

OTHER PUBLICATIONS

3GPP TSG RAN WG1 #96bis, Xi'an, China, Apr. 8-Apr. 12, 2019; R1-1905842; Title: LS on clarification of OTA timing alignment for IAB; Release:Rel-16 ;Work Item: NR_IAB_Core; Source: RAN WG1; To: RAN WG4; (Year: 2019).*

(Continued)

*Primary Examiner* — Abdeltif Ajid
(74) *Attorney, Agent, or Firm* — Lippes Mathias LLP

(57) ABSTRACT

A method for adjusting transmit timing is disclosed. The method includes determining a reference timing advance value $TA_{ref}$ receiving a time offset parameter; and adjusting downlink transmit timing based on i) detected downlink receive timing of radio node and ii) the reference timing advance value $TA_{ref}$ and the time offset parameter.

12 Claims, 7 Drawing Sheets

(56) References Cited

U.S. PATENT DOCUMENTS

| | | | |
|---|---|---|---|
| 2018/0020472 | A1 | 1/2018 | Lin et al. |
| 2018/0102807 | A1 | 4/2018 | Chen et al. |
| 2018/0352527 | A1 | 12/2018 | Wang et al. |
| 2019/0109745 | A1 | 4/2019 | Abedini et al. |
| 2019/0110266 | A1 | 4/2019 | Abedini et al. |
| 2019/0159149 | A1 | 5/2019 | Ryu et al. |
| 2019/0191399 | A1 | 6/2019 | Islam et al. |
| 2019/0223078 | A1 | 7/2019 | Sirotkin et al. |
| 2020/0059879 | A1* | 2/2020 | Nam .................. H04L 27/2666 |
| 2022/0078740 | A1* | 3/2022 | Harada ............. H04W 56/0045 |

FOREIGN PATENT DOCUMENTS

| | | |
|---|---|---|
| CN | 109845357 A | 6/2019 |
| CN | 109964419 A | 7/2019 |
| KR | 20160119628 A | 10/2016 |
| WO | 2019/091052 A1 | 5/2019 |

OTHER PUBLICATIONS

3GPP TSG RAN WG1 Meeting #97 , Reno, USA, May 13-17, 2019; R1-1907667; Agenda item: 7.2.3.4 ; Title: Summary of 7.2.3.4 Mechanism to support the "case-1" OTA timing alignment; Source: ZTE, Sanechips, (Year: 2019).*

"3rd Generation Partnership Project; Technical Specification Group Radio Access Network; NR; Study on Integrated Access and Backhaul; (Release 16)", 3GPP TR 38.874, V16.0.0, Dec. 2018, pp. 1-111.

"New WID: Integrated Access and Backhaul for NR", 3GPP TSG RAN Meeting #82, RP-182882, Agenda: 9.1.2, Qualcomm, Dec. 10-13, 2018, 7 pages.

"New WID: Integrated Access and Backhaul for NR", 3GPP TSG RAN Meeting #82, RP-182322, Agenda: 9.1.2, Qualcomm, Dec. 10-13, 2018, 7 pages.

"3rd Generation Partnership Project; Technical Specification Group Radio Access Network; NR; Requirements for support of radio resource management (Release 16)", 3GPP TS 38.133, V16.0.0, Jun. 2019, pp. 1-1001.

"3rd Generation Partnership Project; Technical Specification Group Radio Access Network; Evolved Universal Terrestrial Radio Access (E-UTRA); Requirements for support of radio resource management (Release 16)", 3GPP TS 36.133, V16.2.0, Jun. 2019, 3604 pages.

"LS on clarification of OTA timing alignment for IAB", 3GPP TSG RAN WG1 #96bis, R1-1905841, Huawei, Apr. 8-12, 2019, 1 page.

"IAB timing", 3GPP TSG RAN WG1 Meeting #92bis, R1-1804624, Agenda: 7.7.3, Nokia, Apr. 16-20, 2018, 5 pages.

"Network synchronization for multi-hop IAB", 3GPP TSG RAN WG1 Meeting #93, R1-1807396, Agenda: 7.7.3, Qualcomm Incorporated, May 21-25, 2018, 10 pages.

"Summary of 7.2.3.5 Mechanism to support the "case-1" OTA timing alignment", 3GPP TSG RAN WG1 Meeting Ad-Hoc Meeting, R1-1901417, Agenda: 7.2.3.5, AT&T, Jan. 21-25, 2019, 4 pages.

"Summary of 7.2.3.5 Mechanism to support the "case-1" OTA timing alignment", 3GPP TSG RAN WG1 #96, R1-1903583, Agenda: 7.2.3.5, AT&T, Feb. 25-Mar. 1, 2019, 4 pages.

"LS on OTA timing alignment for IAB", 3GPP TSG RAN WG1 #96, R1-1903693, RAN WG1, Feb. 25-Mar. 1, 2019, 2 pages.

"LS on OTA timing alignment for IAB", 3GPP TSG RAN WG1 #96, R1-1903810, RAN WG1, Feb. 25-Mar. 1, 2019, 2 pages.

"Summary of 7.2.3.4 Mechanism to support the "case-1" OTA timing alignment", 3GPP TSG RAN WG1 Meeting #96bis, R1-1905778, Agenda: 7.2.3.4, ZTE, Apr. 8-12, 2019, pp. 1-10.

"LS on clarification of OTA timing alignment for IAB", 3GPP TSG RAN WG1 Meeting #96bis, R1-1905842, RAN WG1, Apr. 8-12, 2019, 1 page.

"Summary of 7.2.3.4 Mechanism to support the "case-1" OTA timing alignment", 3GPP TSG RAN WG1 Meeting #97, R1-1907667, Agenda: 7.2.3.4, ZTE, May 13-17, 2019, pp. 1-15.

"3rd Generation Partnership Project; Technical Specification Group Radio Access Network; NR; Physical layer procedures for control (Release 15)", 3GPP TS 38.213, V15.6.0, Jun. 2019, pp. 1-107.

"On IAB node synchronization and timing alignment", 3GPP TSG RAN WG1 Meeting #95, R1-1812202, Agenda: 7.2.3.3, Huawei, Nov. 12-16, 2018, 7 pages.

"Further consideration on timing alignment for IAB nodes", 3GPP TSG RAN WG1 Meeting #94bis, R1-1810133, Agenda: 7.2.3.3, Huawei, Oct. 8-12, 2018, 10 pages.

"Network synchronization for multi-hop IAB networks", 3GPP TSG RAN WG1 Meeting #95, R1-1813420, Agenda: 7.2.3.3, Qualcomm Incorporated, Nov. 12-16, 2018, 9 pages.

International Search Report and Written Opinion received for corresponding Patent Cooperation Treaty Application No. PCT/IB2020/056489, dated Oct. 16, 2020, 13 pages.

"On IAB node synchronization and timing alignment", 3GPP TSG RAN WG1 Meeting #94, R1-1808087, Agenda: 7.2.3.3, Huawei, Aug. 20-24, 2018, 8 pages.

Office action received for corresponding Chinese Patent Application No. 202080057465.4, dated Feb. 7, 2024, 7 pages of office action and no page of translation available.

Notice of Allowance received for corresponding Chinese Patent Application No. 202080057465.4, dated Jul. 26, 2024, 4 pages of Notice of Allowance and no page of translation available.

* cited by examiner

INTEGRATED ACCESS BACKHAUL NODE DOWNLINK TIMING ADJUSTMENT IN PRESENCE OF FREQUENCY OFFSET

RELATED APPLICATION

This application claims priority to PCT Application No. PCT/IB2020/056489 filed Jul. 9, 2020 which claims priority benefit from U.S. application 62/887,207 filed Aug. 15, 2019 which is incorporated herein by reference in its entirety.

TECHNICAL FIELD

The examples and non-limiting embodiments relate generally to communications and, more particularly, to integrated access backhaul node downlink timing adjustment in presence of frequency offset.

BACKGROUND

It is known to provide access to a communications network, and to provide a link between a radio node and a core network.

SUMMARY

The following summary is merely intended to be an example. The summary is not intended to limit the scope of the claims.

In accordance with one aspect, a method includes determining a reference timing advance value $TA_{ref}$, receiving a time offset parameter; and adjusting downlink transmit timing based on i) detected downlink receive timing of a radio node and ii) the reference timing advance value $TA_{ref}$ and the time offset parameter.

In accordance with another aspect, an apparatus includes at least one processor; and at least one memory including computer program code; wherein the at least one memory and the computer program code are configured to, with the at least one processor, cause the apparatus at least to: determine a reference timing advance value $TA_{ref}$, receive a time offset parameter; and adjust downlink transmit timing based on i) detected downlink receive timing of a radio node and ii) the reference timing advance value $TA_{ref}$ and the time offset parameter.

In accordance with yet another aspect, a non-transitory program storage device readable by a machine, tangibly embodying a program of instructions executable by the machine for performing operations is disclosed, the operations comprising: determining a reference timing advance value $TA_{ref}$, receiving a time offset parameter; and adjusting downlink transmit timing based on i) detected downlink receive timing of a radio node and ii) the reference timing advance value $TA_{ref}$ and the time offset parameter.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 1:
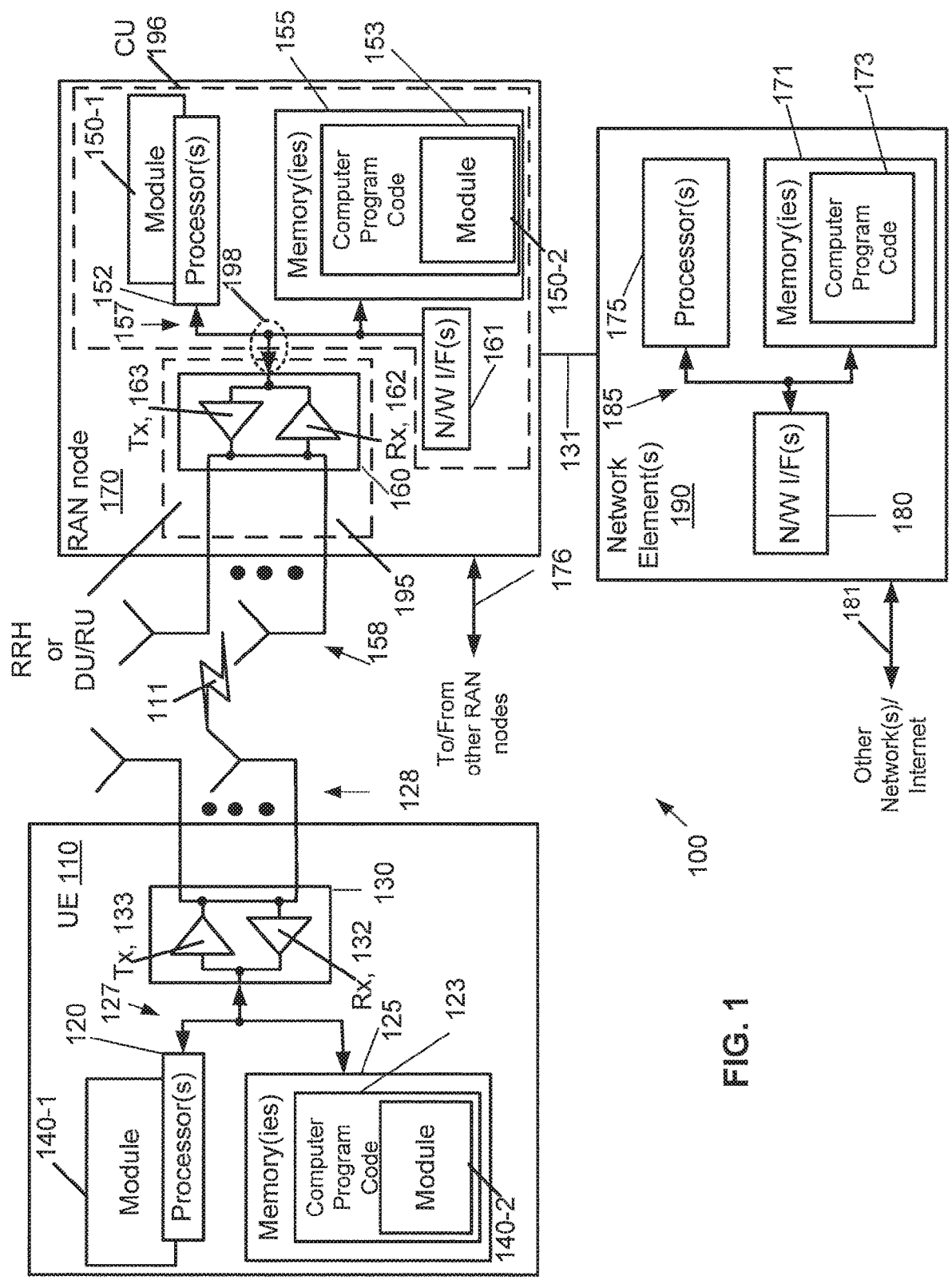
FIG. 1 is a block diagram of one possible and non-limiting system in which the example embodiments may be practiced.

The following acronyms and abbreviations that may be found in the specification and/or the drawing figures are defined as follows:
  3GPP third generation partnership project
  5G fifth generation
  5GC 5G core network
  AMF access and mobility management function
  BH backhaul
  CDL child DL
  CP cyclic prefix
  CU central unit or centralized unit
  D downlink
  DL downlink
  DU distributed unit
  DSP digital signal processor
  eMBB enhanced mobile broadband
  eNB (or eNodeB) evolved Node B (e.g., an LTE base station)
  EN-DC E-UTRA-NR dual connectivity
  en-gNB or En-gNB node providing NR user plane and control plane protocol terminations towards the UE, and acting as secondary node in EN-DC
  E-UTRA evolved universal terrestrial radio access, i.e., the LTE radio access technology
  F flexible
  F1-C F1 (interface between CU and DU) control interface
  F1-AP F1 application protocol
  FFS for further study
  FR frequency range
  gNB (or gNodeB) base station for 5G/NR, i.e., a node providing NR user plane and control plane protocol terminations towards the UE, and connected via the NG interface to the 5GC
  GNSS global navigation satellite system
  GPRS general packet radio services
  GTP GPRS Tunneling Protocol
  GTP-U GTP for user data
  IAB integrated access and backhaul
  ID identity
  I/F interface
  IP internet protocol
  LS liaison statement
  LTE long term evolution
  MAC medium access control
  MME mobility management entity
  MT mobile termination
  ng or NG new generation
  ng-eNB or NG-eNB new generation eNB
  NR new radio
  N/W or NW network
  OTA over-the-air
  PDA personal digital assistant
  PDCP packet data convergence protocol
  PDL parent DL PHY physical layer
PUL parent UL
RACH random-access channel
RAN radio access network
RAN1 or RAN4 RAN meeting
Rel. or Rel- release
RLC radio link control
RN relay node (self-backhaul node)
RP TSG-RAN meeting
RRC radio resource control
RRH remote radio head
RU radio unit
Rx receiver
RX reception
SCS subcarrier spacing
SDAP service data adaptation protocol
SGW serving gateway
SMF session management function
SSB synchronization signal block
TA timing advance
TA_ref timing advance value used for calculating the reference UL timing
T_delta RX-TX switching time related parameter (signaled by the parent node)
TDD time division duplex
TDM time division multiplexing
Te maximum allowed deviation of MT's UL TX timing from the reference timing
Tg RX-TX switching gap in parent node
$TP_{BH}$ propagation delay between a child and a parent node
TSG technical specifications group
Tx transmitter
TX transmission
U uplink
UDP user datagram protocol
UE user equipment (e.g., a wireless, typically mobile device)
UL uplink
UPF user plane function
UTC Coordinated Universal Time
WI work item
WID work item description Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

The examples disclosed herein relate to integrated access and backhaul (IAB) and more specifically to the over-the-air (OTA) timing synchronization of IAB nodes. The 3GPP study item on IAB was finished in 2018 and the results are captured in TR 38.874. The work continues aiming for IAB as Rel.16 feature in the work item defined RP-182882 (New WID: Integrated Access and Backhaul for NR).

IAB scenarios: The goal of 5G NR is to allow network deployment with minimized manual efforts and as automated self-configuration as possible. Especially on higher frequency bands the coverage may be problematic and specific capabilities are needed for NR to enable effortless coverage extensions with minimized or no requirements for network (re-)planning in a fast and cost-effective manner. For these reasons, 3GPP is specifying the IAB solution enabling wireless backhauling for NR sites that do not have fixed (wired/fibre) connection to the network. The usage of wireless connection for the backhaul/fronthaul eliminates the need for cabling of all sites in the deployed network (which can be very dense) which would dramatically reduce the initial deployment costs. Wired backhaul connection may not be an option with moving relays. A viable option is to utilize wireless connection for which IAB provides a feasible basis.

An IAB network supports concatenated relaying where the backhaul can be carried over multiple hops from one IAB node to another until the last node serving the access UEs. The serving node providing the backhaul (BH) connection is called a parent node where the node can be either a donor node (with wired network connection), or another IAB node. The served IAB node is called a child node.

Figure 2:
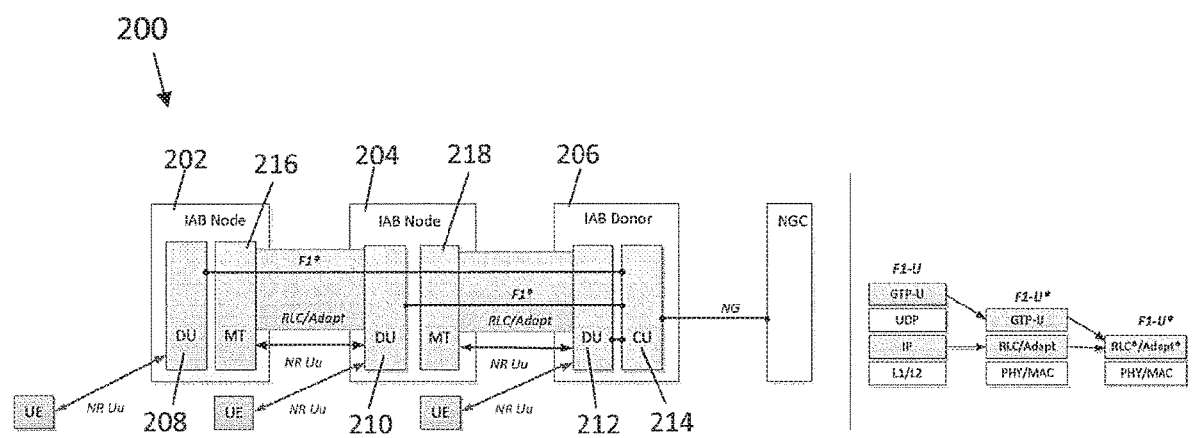
FIG. 2 depicts an example architecture for integrated access and backhaul (IAB).

IAB architecture: There are different options for the IAB architecture. FIG. 2 shows a high-level architecture 200 for L2 relaying with distributed base station, i.e. gNB, architecture which has been adopted as the basis for normative work in the IAB Work Item (WI), RP-182322 (refer also to TR 38.874).

The donor node 206 hosts the centralized unit (CU) 214 for all IAB nodes (including IAB node 202 and IAB node 204), i.e. it runs RRC, higher L2 (PDCP) and control functions for the subtending IAB topology. Distributed units (DUs) reside at the donor node 206 (including DU 212) as well as at each IAB node (including DU 208 of IAB node 202 and DU 210 of IAB node 204). Mobile termination (MT) units (including MT 216 and MT 218) reside at the IAB nodes as the IAB-MT units. The DU (including DU 208, DU 210, and DU 212) hosts lower L2 protocol layers (RLC, MAC) and the physical (PHY) layer. The CU 214 has two control interfaces to the IAB nodes 202, 204, namely radio resource control (RRC) connection to the IAB-MT and F1-C to the IAB-DU.

IAB timing synchronization: The primary use case and deployment of IAB is on time division duplex (TDD) bands (esp. on higher frequency bands, i.e. beyond 6 GHz) which typically are unpaired TDD bands. TDD operation requires tight synchronization to achieve desired spectrum efficiency targets by minimizing the co-channel interference. Also, IAB nodes are to respect half duplex constraint (in the first releases of IAB specifications) where simultaneous transmission (TX) and reception (RX) is not allowed. To form a synchronized network, IAB nodes have to be synchronized with the donor nodes. For that, two options are available:

a) Use of absolute time reference, e.g. UTC timing from GNSS reception.

b) OTA (over the air) synchronization by using the DL RX (by IAB-MT) on the backhaul link as the reference and adjusting the (IAB-DU) DL TX timing based on the timing advance (TA) and parameter T_delta (described herein) on the parent link to compensate the propagation delay over the parent BH link.

The option a) is an implementation option and in general does not have specification impacts. However, GNSS receivers may not be implemented e.g. for cost reasons, or the IAB nodes may be deployed in locations where there is no sufficient coverage for satellite signals, e.g. deep street canyons or indoors.

Figure 3:
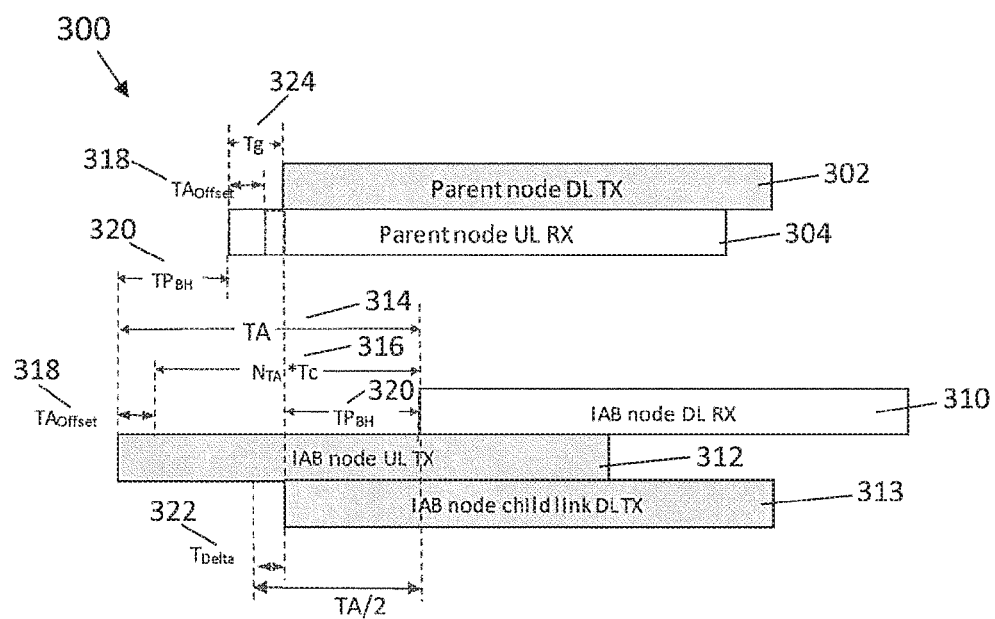
FIG. 3 depicts over the air (OTA) synchronization between parent and child IAB nodes.

To enable synchronization in all scenarios, 3GPP is specifying OTA synchronization (option b). The basic principle of this is illustrated in FIG. 3. FIG. 3 shows OTA synchronization 300 between parent and child IAB nodes on a general level and without consideration of timing drifts.

The goal is to align the DL TX timing of the IAB node and its serving (parent) node. The parent node is used as the "master" and the timing reference and the child node adjusts the DL TX timing to be aligned with the parent. The synchronization procedure is in short as follows:

Legacy timing advance (TA) control loop used to set the IAB-MT UL timing

IAB DL RX timing 310 is used as the reference

IAB UL TX 312 (to parent node 304) is advanced by TA 314 that is the sum of a variable part $N_{TA}*T_c$ 316 and the constant $TA_{Offset}$ 318, which is the legacy UE operation. Here $T_c$ is the basic time unit and $N_{TA}$ an integer adjusted by parent node signaled TA commands or autonomously by the IAB node. The constant $TA_{Offset}$ 318 is configurable in some cases, e.g., with FR1.

IAB-DU TX (DL) timing 313 is offset to the IAB-MT DL RX timing 310

The offset is (TA/2+T_delta), compensating the propagation delay ($TP_{BH}$ 320) over the BH link T_delta 322 is determined and signaled by the parent node to indicate the actual RX-TX switching gap (Tg 324) at the parent node 302

T_delta 322 is not known by the IAB node and therefore has to be signaled from the parent node T_delta=−(½)*Tg According to implementation choice, Tg may somewhat deviate from $TA_{Offset}$ but the deviation may typically be small. Therefore, another signaling option is that T_delta represents only the difference between the constant $TA_{Offset}$ and Tg: T_delta=−(½)(Tg−$TA_{Offset}$) and the offset is (TA/2−$TA_{Offset}$/2+T_delta)

TA commands may be sent whenever the UL timing is not correct

Figure 4:
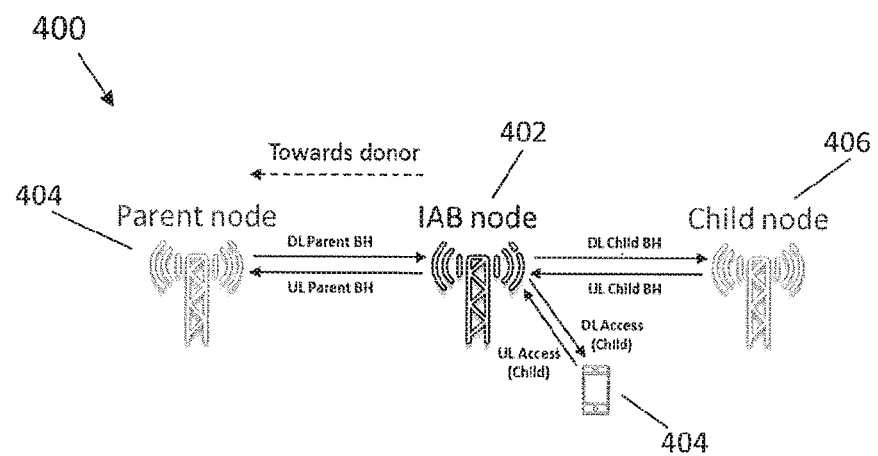
FIG. 4 depicts the naming of link directions for an IAB node.

T_delta 322 may be derived and signaled when the parent node UL RX timing is observed to have changed and/or new TA 314 value is used IAB resource coordination [TR 38.874]: FIG. 4 is an illustration 400 for defining the naming of link directions for an IAB node 402. FIG. 4 therefore provides the definitions of the IAB nodes and links between IAB nodes (including parent node 404, IAB node 402, and child node 406) and access UEs, such as the UE 404.

The timing system may be affected by many error sources. These include measurement errors when a parent node determines the UL RX timing and an IAB node determines the DL RX timing, deviation of the IAB node UL and DL TX timings from their nominal values, and errors due to the finite granularity in TA and T_delta signaling. The examples described herein consider the UL TX timing deviation from the nominal value.

The following discussion clarifies a version of TS 38.133 that, unlike TS 36.133, does not differentiate between N_TA and N_TA_ref, which may be misleading.

In some implementations, IAB node MT may be based on a UE chipset and then MT TX timing setting may preferably be standardized reflecting the UE functionality. In one example, the NR UE specification TS 38.133 intends, like LTE UE specification TS 36.133, to convey that the UE is to calculate the reference timing, that is the DL RX timing minus TA_ref=($N_{TA\_ref}$+$N\_TA_{offset}$)*Tc, and tends to adjust UL TX timing to the reference timing. Here the constant $TA_{Offset}$, introduced earlier in this document, is presented as multiples of the basic time unit: $TA_{Offset}$=N_TAoffset*Tc. $N_{TA\_ref}$ is zero for RACH preambles and updated immediately after UE has applied a TA command to be equal to $N_{TA}$. $N_{TA}$ is related to UE's actual timing advance i.e. UE UL timing is advanced by TA=($N_{TA}$+N_TAoffset)*Tc relative to the reception of DL signal. While $N_{TA\_ref}$ is constant between TA commands, $N_{TA}$ may be changing between the commands i.e. the UL TX timing may differ from the reference timing: according to TS 38.133 the TX timing must be kept within +/−Te window from the reference timing. Te is $3.5*64*T_c$ (=114 ns, where the length of cyclic prefix with 120 kHz SCS equals to $1152*T_c$(=586 ns)) when SCS of SSBs is 120 kHz.

The examples described herein consider IAB operation at FR2 where line-of-sight signal is essential. Then multipath propagation may not affect timing determination, and between the TA commands, the UL TX timing may start to deviate from the reference timing only due to frequency offset between IAB MT and parent DU or due to the relative motion of the nodes. Rel. 16 assumes stationary IAB nodes so that only the frequency offset needs to be considered for nodes of that release.

The specification 38.133 allows (for UEs) the deviation from the reference timing as that is not harmful for UL RX because the UL RX timing is anyway in the control of the gNB and the maximum deviation is only a fraction of the cyclic prefix (CP) length. The same way, the deviation would not be harmful for parent node UL RX. However, to improve the OTA synchronization accuracy, it needs to be specified how the IAB node DU (child link) TX timing is adjusted in the presence of the deviation from the reference timing.

The IAB synchronization is described e.g. in R1-1905841. Analysis of different error sources in IAB node DU TX timing determination is discussed e.g. in R1-1804624 and R1-1807396. In both documents, it is noted that the deviation of the UL TX timing from the reference timing contributes to synchronization error of the IAB node. However, these 3GPP documents do not discuss how to correct the effect of the deviation on the IAB node DL TX timing. In these documents, it has been assumed that DL timing is calculated using the actual timing advance value $TA=(N_{TA}+N\_TA_{offset})*Tc$ and T_delta signaling. The agreements reached in RAN1 are listed below.

R1-1901417. The agreement reached during RAN1 #AH Taipei is as follows. An IAB node may set its DL TX timing ahead of its DL Rx timing by TA/2+T_delta.

- T_delta is signaled from the parent node, where the value is intended to account for factors such as the offset between parent DL Tx and UL Rx, if any due to factors such as Tx to Rx switching time, HW impairments, etc.
- TA is the timing gap between UL Tx timing and DL Rx timing, which is derived based on existing Rel-15 mechanism
- FFS (not necessarily an exhaustive list):
  - value range and granularity of T_delta
  - need for aperiodic/periodic updates of T_delta
  - other timing impairment factors for adjusting IAB node timing to be included in T_delta
  - timing alignment when the IAB node has multiple parents
  - Note: once the design of the above FFS points is in a good shape, an LS to RAN4 may be necessary to solicit their input R1-1903583. The agreement reached during RAN1 #96 Athens is as follows.

- T_delta is indicated by a parent to the child node independently from the existing Rel.15 TA indication from the parent node used to set the UL Tx timing of the child IAB node's MT
- T_delta is updated on an aperiodic basis determined by the parent node
- The child IAB node may trigger its DL TX timing adjustment by TA/2+T_delta after it receives the timing offset T_delta indication from its parent node, if it is using OTA Timing Case 1 to obtain its DL timing.
- FFS: behavior if TA/2+T_delta results in an effective negative timing offset
- FFS: delay between receiving T_delta and application of T_delta at the child node
- Separate value ranges/granularities may be considered for T_delta in FR1 and T_delta in FR2
- Send LS to RAN4 asking them to determine the exact values and granularity of T_delta and provide confirmation on RAN1's assumption on the DL timing accuracy requirements for IAB nodes in case of OTA Case 1 timing is applied across multiple hops—R1-1903693 (Xinghua, Huawei), approved with final LS in R1-1903810

R1-1905778. The agreement reached during RAN1 #96bis Xi'an is as follows. In order to align the DL TX timing of the IAB node with the DL TX timing of the parent node by setting DL TX timing of the IAB node (TA/2+T_delta) ahead of its DL Rx timing, T_delta may be set to the (−1/2) of time interval at the parent node between the start of UL RX frame i for the IAB node and the start of DL TX frame i.

- The setting of T_delta is not necessarily specified.
- Note: The above setting of T_delta assumes that, for the same purpose, TA may be the time interval at the IAB node between the start of UL TX frame i and the start of DL RX frame i.
- Send LS to RAN4 for timing clarification such as (Xinghua, Huawei) R1-1905841, which is approved with the following updates:
- IAB Core
- Fix meeting location for the August meeting
- Fix the top blue box in the appendix from UL to DL Final LS in R1-1905842. Also per the RAN1 #96bis Xi'an agreement, in case the calculated TA/2+T_delta at IAB node is negative, the IAB node may not adjust its DL-Tx timing.

R1-1907667. An agreement was that in Rel-16, an IAB node is not expected to receive T_delta when the IAB node MT is not in RRC_Connected mode.

The examples described herein generally apply for stationary IAB nodes. With moving nodes, the situation is more complex as the deviation of UL TX timing from the reference timing may include two components: the propagation delay change that may be taken into account when adjusting IAB node DL TX timing relative to its DL RX timing and the effect of frequency offset that must not change the DL TX timing relative to the RX timing. With stationary nodes, only handling the frequency offset needs to be considered.

Figure 5:
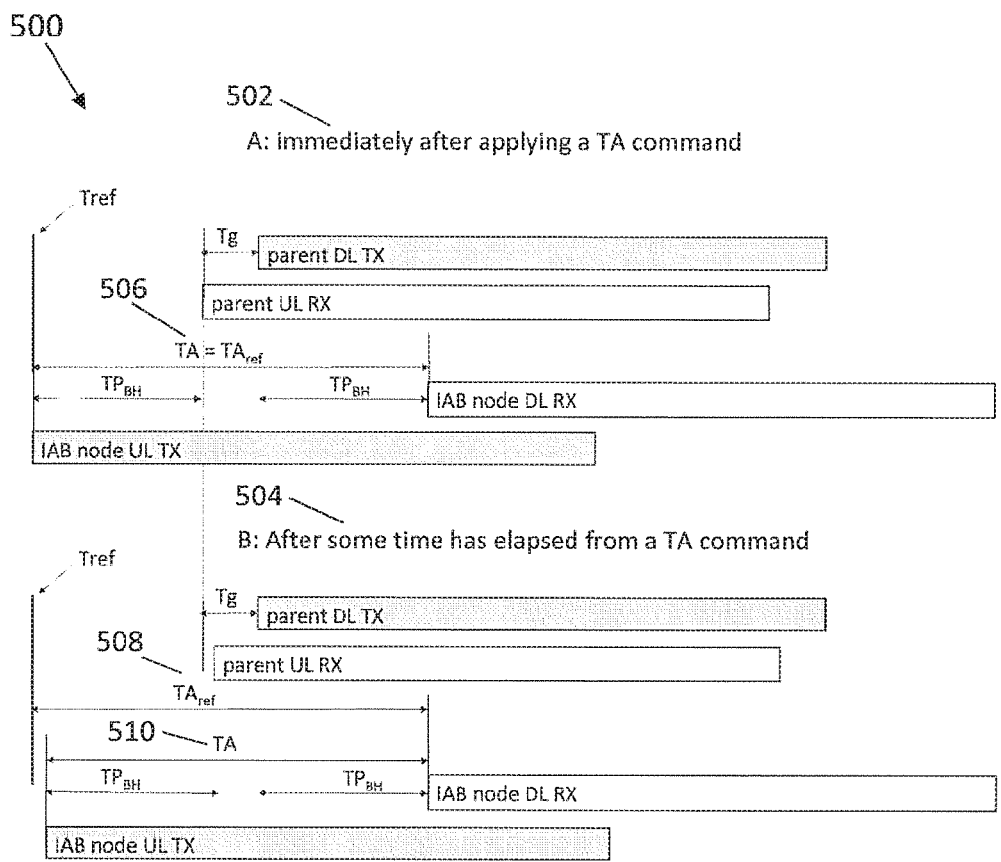
FIG. 5 depicts an estimation of the signal propagation delay $TP_{BH}$ between an IAB node and a parent of the IAB node.

Instead of regarding the deviation of the IAB node UL TX timing from the reference timing as a random error with the maximum value of +/−Te, the deviation is handled when setting the IAB node DL TX timing. FIG. 5 is an illustration 500 of an estimation of the signal propagation delay $TP_{BH}$ between an IAB node and its parent. The top half of FIG. 5, at 502, shows the timings immediately after the node has applied a TA command that it has received from its parent node. At that moment TA_ref is made equal to the updated TA (see reference 506). Later, as shown in the bottom half of FIG. 5, at 504, TA may differ from TA_ref (compare reference 508 with reference 510) if MT follows UL TX timing derived from its own clock (in offset with parent node clock) and not continuously correcting UL TX timing equal to the reference timing. The specifications 38.213 and 38.133 allow such behavior as long as the UL TX timing deviation from the reference timing stays within +/−Te. The parent node would also notice the deviation as a shift in the UL RX timing. But as Te is short compared with CP, a TA command is not always necessary for optimizing UL reception. Also, T_delta update is not necessary for IAB node DL timing because the timing may be correctly calculated from the DL RX timing using the constant TA_ref. Using once obtained TA_ref and T_delta, small variations due to clock drifts are handled so that they do not affect IAB node DL timing. Therefore, the parent node does not need to react to small deviations it observes. The parent node has the freedom to change TA and T_delta at any time:

If TA command is sent that would typically mean also a change in T_delta so that the system goes from the situation B to A in FIG. 5.

If only new T_delta is signaled, $TP_{BH}$ estimate changes without change in the parent UL RX timing. However, if in the situation of the bottom half of FIG. 5 only T_delta is changed, it would lead to a wrong $TP_{BH}$ estimate. The right $TP_{BH}$ is obtained if T_delta change triggers implicitly also TA_ref update equal to TA.

The correct IAB node DL timing is thus obtained by estimating propagation delay always using TA_ref (and the signaled T_delta parameter) and not adjusting it continuously according to the actual TA:

$$TP_{BH}=TA\_ref/2+T\_delta.$$

A difference compared to prior methods is using TA_ref instead of TA in the equation $TP_{BH}$=TA_ref/2+T_delta.

Figure 6:
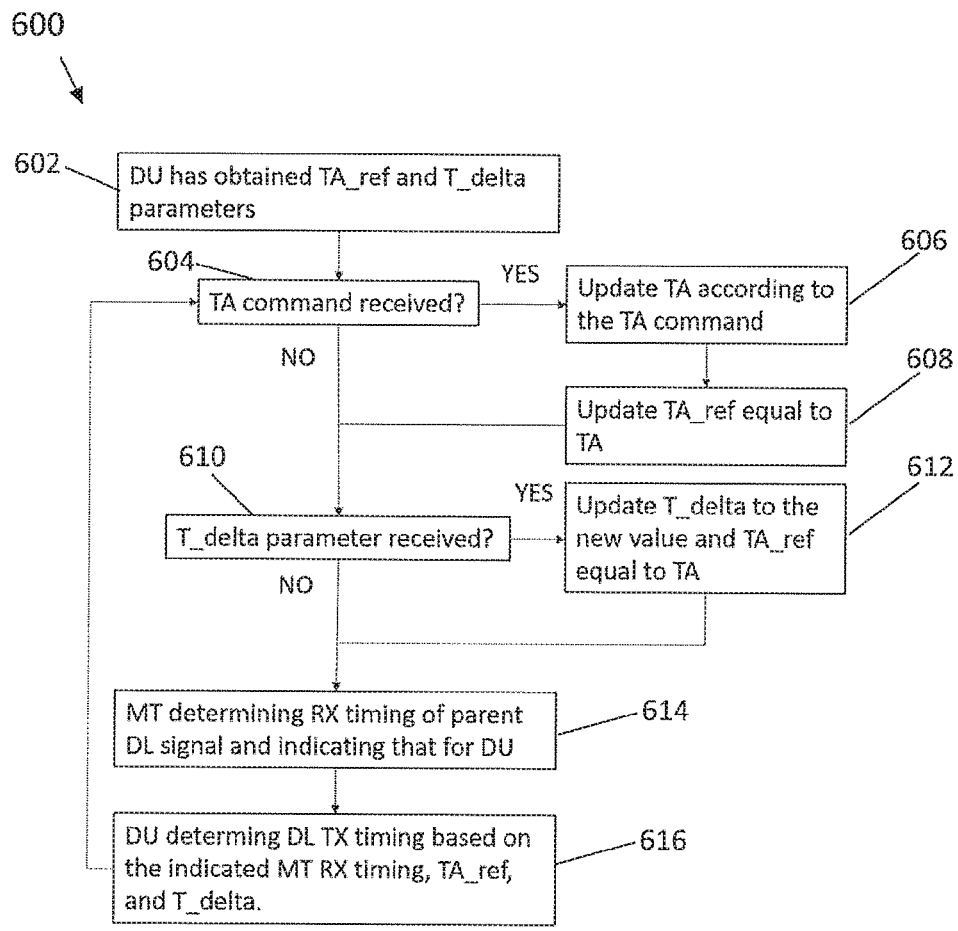
FIG. 6 shows an example procedure for adjusting distributed unit (DU) downlink (DL) transmission (TX) timing.

FIG. 6 depicts an example procedure 600 of DU DL timing adjustment. At 602, IAB node DU obtains TA_ref and T_delta parameters. At 604, a determination is performed considering whether or not a TA command has been received. If at 604 the TA command has been received, then at 606, TA is updated according to the received TA command. Following 606, at 608, TA_ref is updated to be equal to TA and the method proceeds to 610 where it is determined whether a T_delta parameter has been received. If at 604 the TA command has not been received, then the method proceeds to 610, where the determination is made whether or not the T_delta parameter has been received. If at 610 the T_delta parameter has been received, then at 612, T_delta is updated to the new value and, if TA_ref has not been updated via 606 and 608, TA_ref is updated to be equal to TA, followed by proceeding to 614. If at 610 the T_delta parameter has not been received, then the method proceeds to 614. At 614, the procedure involves MT determining RX timing of parent DL signal and indicating that for DU. At 616, the procedure involves DU determining DL TX timing based on the indicated MT RX timing, TA_ref, and T_delta.

In the beginning, an IAB node may operate like a UE and transmit only in UL. The IAB node DU may start to transmit (in DL) only after it has once received TA_ref and T_delta parameters and IAB node MT RX timing. TA update at 606 leads to TA_ref update at 608 (and DL timing update at 616) as shown in the procedure 600.

Different variants of the procedure 600 are possible. It may be defined that T_delta update is sent only together with a TA command. This would be reasonable e.g. if T_delta has a smaller granularity than TA commands and may thus be used for improving the TX timing accuracy beyond the limit set by TA command granularity. In another variant, shown in FIG. 6, T_delta reception is interpreted meaning also zero TA command which would lead to updating TA_ref equal to TA at 612. In yet another variant, all processing is done in MT at 614 that provides directly the DL signal timing for DU.

There are various implementation options for the procedure 600 shown in FIG. 6. For example, step 604 may be carried out always when MT part of the IAB node has received the TA command and/or T_delta parameter. In addition, the procedure (including step 604) may be carried out based on an IAB implementation decision, e.g. when the IAB MT has determined that Rx timing of the parent DL signal has changed (e.g. by a predefined value) compared to the previous adjustment (step 616).

Another implementation option of the procedure 600 is that once DU has obtained TA_ref and T_delta parameters it continues determining its DL timing using these parameters until a TA command or a new T_delta is received. Thus the procedure would stay in loop 614-616-614 until a move to 604 is triggered by a parameter change.

Figure 7:
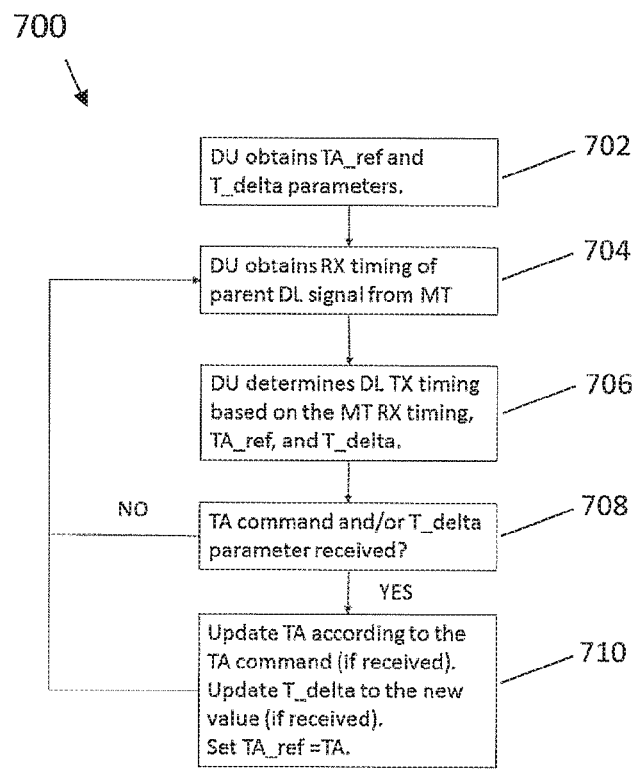
FIG. 7 shows another example procedure for adjusting DU DL TX timing.

FIG. 7 shows another example procedure 700 for adjusting DU DL TX timing. At 702, the DU obtains TA_ref and T_delta parameters. At 704, the DU obtains RX timing of the parent DL signal from an MT. At 706, the DU determines DL TX timing based on the MT RX timing, TA_ref, and T_delta. At 708, a determination is made as to whether a TA command and/or a T_delta parameter has been received. If at 708 the determination is negative (e.g., "NO"), then the procedure 700 proceeds to 704. If at 708 the determination is positive (e.g., "YES"), then the procedure 700 proceeds to 710. At 710, TA is updated according to the TA command (if received). Also at 710, T_delta is updated to the new value (if received). At 710, TA_ref is set to be TA. Following 710, the procedure proceeds to 704.

The examples described herein provide many advantages when compared with previous methods. Such advantages include a) improving IAB synchronization by eliminating one error source, b) allowing MT UL timing setting as specified for UEs in 38.133, i.e. the UL timing may differ from the reference timing within +/−Te, which may simplify utilizing UE chipset for MT implementation, and c) avoiding frequent TA and T_delta signaling for correcting the effect of frequency offset with previous systems. The examples disclosed herein may be standardized.

In accordance with an example method, a method includes determining a reference timing advance value $TA_{ref}$; receiving a time offset parameter; and adjusting downlink transmit timing based on i) detected downlink receive timing of a radio node and ii) the reference timing advance value $TA_{ref}$ and the time offset parameter.

In accordance with an example method, a method includes transmitting a time offset parameter; wherein a reference timing advance value $TA_{ref}$ is determined; wherein downlink transmit timing is adjusted based on i) detected downlink receive timing of a radio node and ii) the reference timing advance value $TA_{ref}$ and the time offset parameter.

In accordance with an example apparatus, an apparatus includes at least one processor; and at least one non-transitory memory including computer program code; wherein the at least one memory and the computer program code are configured to, with the at least one processor, cause the apparatus at least to perform: determining a reference timing advance value $TA_{ref}$; receiving a time offset parameter; and adjusting downlink transmit timing based on i) detected downlink receive timing of a radio node and ii) the reference timing advance value $TA_{ref}$ and the time offset parameter.

In accordance with an example apparatus, an apparatus includes at least one processor; and at least one non-transitory memory including computer program code; wherein the at least one memory and the computer program code are configured to, with the at least one processor, cause the apparatus at least to perform: transmitting a time offset parameter; wherein a reference timing advance value $TA_{ref}$ is determined; wherein downlink transmit timing is adjusted based on i) detected downlink receive timing of a radio node and ii) the reference timing advance value $TA_{ref}$ and the time offset parameter.

In accordance with an example non-transitory program storage device, a non-transitory program storage device readable by a machine, tangibly embodying a program of instructions executable by the machine for performing operations is disclosed, the operations comprising: determining a reference timing advance value $TA_{ref}$; receiving a time offset parameter; and adjusting downlink transmit timing based on i) detected downlink receive timing of a radio node and ii) the reference timing advance value $TA_{ref}$ and the time offset parameter.

In accordance with an example non-transitory program storage device, a non-transitory program storage device readable by a machine, tangibly embodying a program of instructions executable by the machine for performing operations is disclosed, the operations comprising: transmitting a time offset parameter; wherein a reference timing advance value $TA_{ref}$ is determined; wherein downlink transmit timing is adjusted based on i) detected downlink receive timing of a radio node and ii) the reference timing advance value $TA_{ref}$ and the time offset parameter.

In accordance with an example method, a method includes transmitting a time offset parameter; and transmitting a timing advance command.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   determining, by a radio node, a reference timing advance value parameter $TA_{ref}$;
   receiving, by the radio node, a time offset parameter $T_{delta}$, wherein $T_{delta}$ is only received together with a timing advance command;
   updating $TA_{ref}$ equal to timing advance; and
   adjusting, by the radio node, downlink transmit timing based on i) detected downlink receive timing and ii) the reference timing advance value $TA_{ref}$ and the time offset parameter,
   wherein the radio node is an integrated access and backhaul node comprising a distributed unit part, wherein the distributed unit part comprises at least one interface to a user equipment and a mobile termination part of another integrated access and backhaul node,
   wherein all processing is done in mobile termination that provides directly downlink signal timing for the radio node,
   wherein once the radio node has obtained $TA_{ref}$ and $T_{delta}$ parameters the radio node continues determining downlink timing using the $TA_{ref}$ and $T_{delta}$ parameters until a timing advance command or a new $T_{delta}$ is received, wherein the method stays in a loop until a move is triggered by a parameter change,
   wherein the downlink transmit timing is determined based on detected receive timing of a mobile termination part of the radio node minus a propagation delay parameter $TP_{BH}$ between the radio node and a parent radio node,
   wherein the propagation delay parameter $TP_{BH}$ is determined as either:
   $TA_{ref}/2 + T_{delta}$ wherein $T_{delta}$ corresponds to $(-\frac{1}{2})$ of $T_g$, wherein $T_g$ corresponds to a time interval at the parent radio node between a start of an uplink reception frame i for a radio node and a start of a downlink transmission frame i, or
   $(TA_{ref} - TA_{Offset})/2 + T_{delta}$ wherein $T_{delta}$ corresponds to $(-\frac{1}{2})$ of $T_g - TA_{Offset}$ and $TA_{Offset}$ corresponds to a second offset parameter.

2. The method of claim 1, wherein the time offset parameter $T_{delta}$ corresponds to either:
   $(\frac{1}{2})$ of $T_g$, wherein $T_g$ corresponds to a time interval at a parent radio node between a start of an uplink reception frame i for the radio node and a start of a downlink transmission frame i; or
   $(\frac{1}{2})$ of $(T_g - TA_{Offset})$, wherein $TA_{Offset}$ corresponds to a second offset parameter.

3. The method of claim 1, wherein $T_{delta}$ signaling resets $TA_{ref}$ to a value of a timing advance used by the mobile termination part.

4. The method of claim 1, wherein each of the timing parameters are indicated using at least one of separate information elements and separate messages.

5. The method of claim 1, wherein the radio node is an integrated access and backhaul node comprising a distributed unit part, wherein the distributed unit part comprises at least one interface to a user equipment and a mobile termination part of another integrated access and backhaul node.

6. The method of claim 1, wherein the downlink transmit timing is adjusted by a distributed unit part of the radio node, and the detected downlink receive timing is based on a mobile termination part of the radio node.

7. An apparatus comprising:
   at least one processor; and
   at least one non-transitory memory including computer program code;
   wherein the at least one memory and the computer program code are configured to, with the at least one processor, cause the apparatus at least to:
   determine a reference timing advance value parameter $TA_{ref}$;
   receive a time offset parameter $T_{delta}$, wherein $T_{delta}$ is only received together with a timing advance command;
   update $TA_{ref}$ equal to timing advance; and
   adjust downlink transmit timing based on i) detected downlink receive timing and ii) the reference timing advance value $TA_{ref}$ and the time offset parameter, wherein the apparatus is an integrated access and backhaul radio node comprising a distributed unit part, wherein the distributed unit part comprises at least one interface to a user equipment and a mobile termination part of another integrated access and backhaul radio node,
   wherein all processing is done in mobile termination that provides directly downlink signal timing for the radio node,
   wherein once the radio node has obtained $TA_{ref}$ and $T_{delta}$ parameters the radio node continues determining downlink timing using the $TA_{ref}$ and $T_{delta}$ parameters until a timing advance command or a new $T_{delta}$ is received, staying in a loop until a move is triggered by a parameter change,
   wherein the downlink transmit timing is determined based on detected receive timing of a mobile termination part of the radio node minus a propagation delay parameter $TP_{BH}$ between the radio node and a parent radio node, wherein the propagation delay parameter $TP_{BH}$ is determined as either: $TA_{ref}/2+T_{delta}$ wherein $T_{delta}$ corresponds to $(-\frac{1}{2})$ of $T_g$, wherein $T_g$ corresponds to a time interval at the parent radio node between a start of an uplink reception frame i for a radio node and a start of a downlink transmission frame i, or $(TA_{ref}-TA_{Offset})/2+T_{delta}$ wherein $T_{delta}$ corresponds to $(-\frac{1}{2})$ of $T_g-TA_{Offset}$ and $TA_{Offset}$ corresponds to a second offset parameter.

8. The apparatus of claim 7, wherein the time offset parameter $T_{delta}$ corresponds to either:

($\frac{1}{2}$) of $T_g$, wherein $T_g$ corresponds to a time interval at a parent radio node between a start of an uplink reception frame i for the apparatus and a start of a downlink transmission frame i; or ($\frac{1}{2}$) of $(T_g-TA_{Offset})$, wherein $TA_{Offset}$ corresponds to a second offset parameter.

9. The apparatus of claim 7, wherein $T_{delta}$ signaling resets $TA_{ref}$ to a value of a timing advance used by the mobile termination part.

10. The apparatus of claim 7, wherein each of the timing parameters are indicated using at least one of separate information elements and separate messages.

11. The apparatus of claim 7, wherein the downlink transmit timing is adjusted by a distributed unit part of the apparatus, and the detected downlink receive timing is based on a mobile termination part of the apparatus.

12. A non-transitory program storage device readable by a machine, tangibly embodying a program of instructions executable by the machine for performing operations, the operations comprising:

determining a reference timing advance value parameter $TA_{ref}$;

receiving a time offset parameter $T_{delta}$, wherein $T_{delta}$ is only received together with a timing advance command;

updating $TA_{ref}$ equal to timing advance; and adjusting downlink transmit timing based on i) detected downlink receive timing of a radio node and ii) the reference timing advance value $TA_{ref}$ and the time offset parameter, wherein the machine is an integrated access and backhaul radio node comprising a distributed unit part, wherein the distributed unit part comprises at least one interface to a user equipment and a mobile termination part of another integrated access and backhaul radio node, wherein all processing is done in mobile termination that provides directly downlink signal timing for the radio node, wherein once the node has obtained $TA_{ref}$ and $T_{delta}$ parameters the radio node continues determining downlink timing using the $TA_{ref}$ and $T_{delta}$ parameters until a timing advance command or a new $T_{delta}$ is received, staying in a loop until a move is triggered by a parameter change, wherein the downlink transmit timing is determined based on detected receive timing of a mobile termination part of the radio node minus a propagation delay parameter $TP_{BH}$ between the radio node and a parent radio node, wherein the propagation delay parameter $TP_{BH}$ is determined as either: $TA_{ref}/2+T_{delta}$ wherein $T_{delta}$ corresponds to $(-\frac{1}{2})$ of $T_g$, wherein $T_g$ corresponds to a time interval at the parent radio node between a start of an uplink reception frame i for a radio node and a start of a downlink transmission frame i, or $(TA_{ref}-TA_{Offset})/2+T_{delta}$ wherein $T_{delta}$ corresponds to $(-\frac{1}{2})$ of $T_g-TA_{Offset}$ and $TA_{Offset}$ corresponds to a second offset parameter.

\* \* \* \* \*